Aug. 22, 1950    M. W. MARIEN    2,519,683
PISTON RING
Filed Sept. 17, 1947
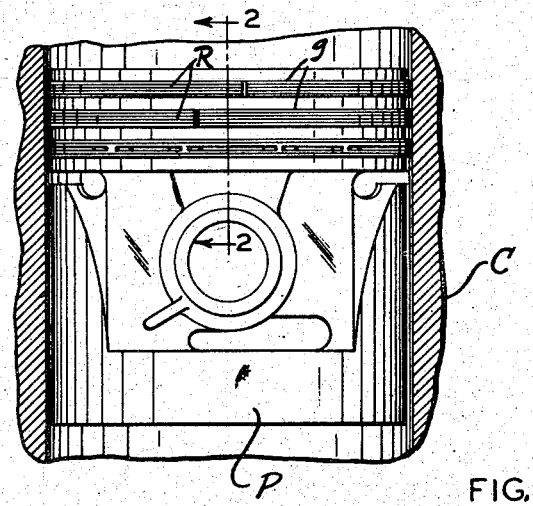
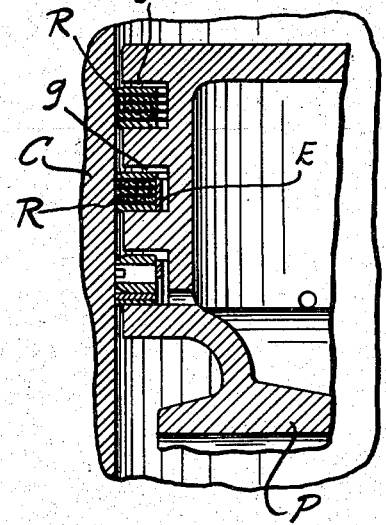
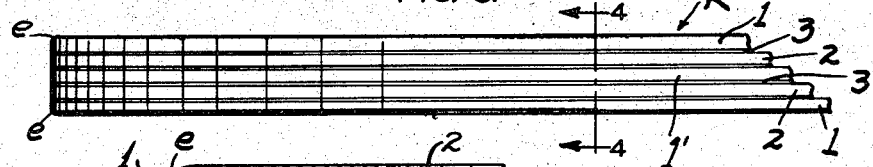
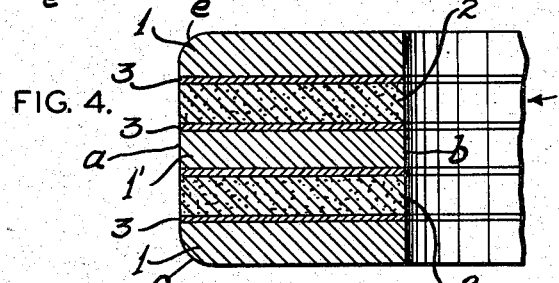
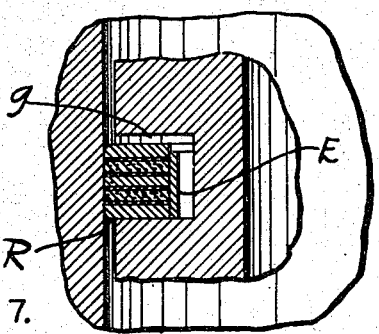
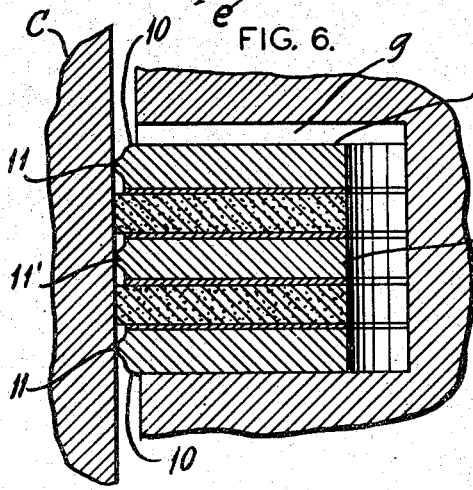
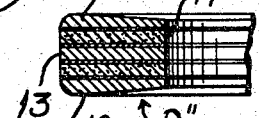
INVENTOR:
MELVIN W. MARIEN
BY Harry A. Beimer
ATTORNEY.

Patented Aug. 22, 1950

2,519,683

UNITED STATES PATENT OFFICE 2,519,683

PISTON RING

Melvin W. Marien, St. Louis, Mo., assignor to Ramsey Corporation, Wilmington, Del., a corporation of Delaware Application September 17, 1947, Serial No. 774,641

5 Claims. (Cl. 309—44)

My invention has relation to improvements in piston packing rings and it consists in the novel features of construction more fully set forth in the specifications and pointed out in the claims.

The invention consists essentially in forming a one-piece piston ring and annular laminations of two or more metals arranged in alternation; that is, any two juxtaposed laminations will be of different metals having different physical properties and being of different degrees of hardness. The present invention more specifically is an improvement over that shown in Patent No. 2,406,844, granted to Charles A. Marien and myself on September 3, 1946.

The objects of the present invention are, therefore, the same as those set forth in the patent referred to, but in addition thereto it is the principal object of the present invention to utilize laminations having a high degree of porosity in building up my improved piston ring whereby oil may be carried in the pores of these particular laminations to give to the ring lubricating properties not possessed by the ring of the patent above referred to.

I accomplish this object by alternating steel laminations with laminations of a synthetic metallic material such as sintered iron, steel, or bronze obtainable on the market under various trade names, of which "Oilite" is an example.

This synthetic material is manufactured of highly comminuted particles of iron, steel or bronze pressed into the desired shape (in the present case an annulus) and then heat-treated to the point where the particles become fused together or sinter, resulting in a structure of great strength having the hardness of the original material but at the same time being porous to the degree that the material is capable of absorbing and holding considerable quantities of oil or other lubricating fluid. At the same time the synthetic material does not have the strength of cast iron or steel so that when subject to frictional contact with the cylinder wall of an engine it will break down or "sluff-off" without welding and heat under excessive pressure before scoring the cylinder wall.

In producing my improved piston ring the laminations of the different materials, that is, steel and "Oilite," are bonded together by metal of less hardness than either of the materials constituting the laminating elements. This bonding material is preferably a solder having a melting point below the temperature at which the temper of the steel will be seriously impaired but not sufficiently low so that it will fuse at the normal temperatures to which an engine cylinder is subjected in operation. The advantage of the porous laminations will exist throughout the entire life of the piston ring and give to the ring the general characteristics of a bearing material. The manner in which I accomplish this object will be better apparent from a description of the invention in connection with the accompanying drawings, in which:

Fig. 1 is a side elevation of a piston showing my improved ring in the top and the middle ring grooves; Fig. 2 is an enlarged longitudinal section through the head of the piston showing my improved rings in cross-section; Fig. 3 is an enlarged face view of a fragment of the ring; Fig. 4 is a further enlarged cross-section taken on the line for 4—4 of Fig. 3; Fig. 5 is an enlarged cross-section through the middle piston ring; Fig. 6 is a cross-section showing a slightly modified form of the invention showing peripheral ridges on the steel laminations to facilitate their wearing in rapidly; and Fig. 7 is a further modified form of the invention in which a wedge-shaped type of ring adapted for use in airplane engines is shown.

Referring to the drawings, P represents a piston operable in the cylinder C, the two upper grooves g, g of said piston being equipped with my improved piston ring R.

The ring R is built up of a series (in the present case five) of steel or cast iron segments 1, 1, 1' sweated or soldered to intermediate segments 2, 2 by thin layers 3 of a softer metal, such as tin, cadmium or a suitable solder. The layers 2 consist of the material hereinbefore referred to and known to the trade as "Oilite" or some material having similar physical properties. The essential characteristic of the layers 2 is their porosity, whereby they are capable of carrying considerable oil, and their friability as compared to the steel segments 1, 1'. The segments 1, 1' and 2 are built up into a pile as shown in the drawings with the desired amount of soldering material in between and then subjected to pressure and heat to effect the bonding thereof. The heat should be just sufficient to fuse the solder whereby, under the pressure applied, it will flow into intimate contact with the segments 1, 1' and 2 to effect a secure joining of such segments and form an integral ring R.

Among the metals suitable for the bonding material 3 are tin, cadmium and zinc; and among the solders are silver-cadmium, and zinc-cadmium solders. Additional materials and alloys having properties suitable for the layers 3 may be determined experimentally.

After the segments 1, 1', 2 have been joined as above explained to form an integral ring R the face a and the back b are machined to size and their smooth surfaces produced free from excess solder or other metal.

Thus the ring R presents to the wall of the cylinder C three separate metallic surfaces, those of the steel segments, those of the porous metallic segments, and those of the bonding material. The steel segments give strength to the unitary ring structure, the porous segments provide lubrication, and the bonding material is available to heal any score marks that may be formed on the cylinder wall during the operation of the piston. The outer edges e of the ring R may be rounded as shown (Fig. 4) or they may be square or bevelled as desired.

In Fig. 6 I show a modified form of ring R' in which the steel segments 10, 10, 10' are formed with peripheral ridges 11, 11, 11' whereby they will wear in more rapidly and more quickly become seated against the cylinder wall in operation.

In Fig. 7 I show a wedge-shaped ring R" suitable for certain types of airplane engines. This ring is similar in construction to the ring R except that the outer segments 12, 12 are slightly wedge-shaped so that the ring is wider at its face 13 than at its back surface 14.

It will be observed that I show an inner ring or expander E behind my composite ring R in the middle groove g of the piston. However, an expander is not essential in all installations and is used only where necessary to augment the ring tension.

As stated above, the bonding material 3 being of a softer material than that of the segments 1, 1' and 2 serves as a healing or anti-scuffing media for any injuries or damage to the cylinder wall during the operation of the piston P.

Obviously, but a small amount of the healing material need be provided. Therefore a typical ring for a ⅛" groove may be composed of five segments, each having a thickness of .0225" while the thickness of the healing media between adjacent segments is approximately .003". In the finishing operations the sides of the ring are dressed down to proper size. These dimensions are not critical but are merely given as an example. The number of segments and the thickness thereof may also be varied through wide limits to apply the piston ring R to all sizes of piston ring grooves and the thickness of the bonding material may also be varied.

Having described my invention, I claim:

1. A composite piston ring comprising at least two annular metallic segments joined flatwise into an integral structure by a cohering metallic substance, one of said segments consisting of comminuted particles sintered into a porous mass.

2. A composite piston ring comprising at least two annular metallic segments permanently joined flatwise in juxtaposition into an integral structure by a cohering metallic substance, one of said segments consisting of comminuted particles sintered into a porous mass.

3. A piston ring composed of a plurality of superposed annular metallic segments, some of said segments consisting of comminuted particles sintered into a porous mass, and a metallic bonding material between the segments to form a composite ring structure of laminations joined flatwise.

4. A composite piston ring comprising at least two annular metallic segments of a ferrous material joined flatwise in juxtaposition into an integral structure by a cohering metallic substance of a non-ferrous material, one of said segments consisting of comminuted particles sintered into a porous mass.

5. A composite piston ring comprising a plurality of iron or steel annular segments soldered together flatwise to form a coherent integral pile, at least one of said segments consisting of a sinter of relatively high porosity.

MELVIN W. MARIEN.

REFERENCES CITED

The following references are of record in the file of this patent:

UNITED STATES PATENTS

| Number | Name | Date |
| --- | --- | --- |
| 2,202,899 | Colwell | June 4, 1940 |
| 2,337,588 | Colkins | Dec. 28, 1943 |
| 2,406,844 | Marien | Sept. 3, 1946 |